United States Patent [19]

Maruyama et al.

[11] Patent Number: 5,540,051

[45] Date of Patent: Jul. 30, 1996

[54] CONTROL MECHANISM FOR HYDROSTATIC-MECHANICAL POWER TRANSMISSION SYSTEM

[75] Inventors: Ryoichi Maruyama; Hideki Yamada; Tsutomu Ishino, all of Komatsu, Japan

[73] Assignee: Komatsu Ltd., Tokyo, Japan

[21] Appl. No.: 529,318

[22] Filed: Sep. 18, 1995

Related U.S. Application Data

[63] Continuation of Ser. No. 300,087, Sep. 2, 1994, abandoned, which is a continuation of Ser. No. 952,889, Nov. 20, 1992, abandoned.

[30] Foreign Application Priority Data

Nov. 26, 1990 [JP] Japan ................... 2-323930

[51] Int. Cl.$^6$ .................................................. F16D 31/02
[52] U.S. Cl. ..................... 60/438; 60/491; 475/76; 475/80
[58] Field of Search .................. 60/437, 438, 435, 60/490, 491; 475/76, 80

[56] References Cited

U.S. PATENT DOCUMENTS

| | | | |
|---|---|---|---|
| 3,943,715 | 3/1976 | Mivao et al. | 60/431 |
| 4,019,404 | 4/1977 | Schauer | 60/437 |
| 4,246,806 | 3/1981 | Mizuno et al. | 74/862 |
| 4,253,347 | 1/1981 | Reynolds et al. | 74/687 |
| 4,497,223 | 2/1985 | Maruyama et al. | |
| 4,531,431 | 7/1985 | Dreher et al. | 60/438 |
| 4,895,049 | 1/1990 | Kita et al. | |

FOREIGN PATENT DOCUMENTS

| | | |
|---|---|---|
| 54-30358 | 3/1979 | Japan . |
| 54-35558 | 3/1979 | Japan . |
| 54-102456 | 8/1979 | Japan . |
| 55-17241 | 5/1980 | Japan . |
| 56-48752 | 11/1981 | Japan . |
| 59-208256 | 11/1984 | Japan . |
| 59-212563 | 12/1984 | Japan . |
| 62-31660 | 7/1987 | Japan . |

*Primary Examiner*—F. Daniel Lopez
*Attorney, Agent, or Firm*—Armstrong, Westerman, Hattori, McLeland & Naughton

[57] ABSTRACT

A control mechanism for a hydrostatic-mechanical power transmission system having a mechanical transmission unit driven through an input shaft connectable to a power source, and a hydrostatic transmission unit that is connectable to the input shaft and includes a pump and a motor each having a displacement setting swash plate. The control mechanism further includes a differential unit for connecting an output shaft to the mechanical transmission unit and the hydrostatic transmission unit to drive. At least either of the displacement setting swash plates is variable in angle. The control mechanism also includes a throttle position detector for detecting the position of a throttle in relation to the power source; a target motor speed ratio setting device for setting, based on the position of the throttle detected by the throttle position detector, a target motor speed ratio that is a target value for the ratio of the revolution speed of the motor in the hydrostatic transmission unit to the revolution speed of the power source; and a swash plate angle controller for controlling at least either of the angles of the displacement setting swash plates by feed-forward control in which the target motor speed ratio set by the target motor speed ratio setting device is used in such a way that the ratio of a displacement volume of the pump to a displacement volume of the motor is made to follow the target motor speed ratio.

18 Claims, 3 Drawing Sheets

CONTROL MECHANISM FOR HYDROSTATIC-MECHANICAL POWER TRANSMISSION SYSTEM

This application is a continuation of application Ser. No. 08/300,087 filed Sep. 2, 1994, now abandoned which is a continuation of application Ser. No. 07/952,889 filed Nov. 20, 1992, now abandoned.

TECHNICAL FIELD

The present invention relates to a control mechanism for a hydrostatic-mechanical power transmission system, provided with a mechanical transmission unit driven through an input shaft connectable to a power source; a hydrostatic transmission unit that is connectable to the input shaft and includes a pump and a motor each having a displacement setting swash plate, at least either of the displacement setting swash plates being variable in angle; and a differential unit for connecting an output shaft to the mechanical transmission unit and the hydrostatic transmission unit to drive.

BACKGROUND ART

One proposal of a control mechanism for a hydrostatic-mechanical power transmission system of the above type is disclosed in Japanese Patent Publication No. 31660/1987. The control operation of the control mechanism for a hydrostatic-mechanical power transmission system in the above patent publication will be hereinbelow described.

A target revolution speed for the engine working as a power source is firstly obtained from throttle position, and then the deviation of the actual revolution speed of the engine from the target engine revolution speed is obtained. In accordance with the above deviation, the angle of the displacement setting swash plate of the pump disposed in the hydrostatic transmission unit is controlled, thereby making the actual engine revolution speed approach to the target engine revolution speed.

The above-described control mechanism, however, has poor response performance because of its feed-back control in which the amount of controlling the angle of the displacement setting swash plate of the pump in the hydrostatic transmission unit is based on the deviation of engine revolution speed.

In order to overcome such a drawback, the invention seeks to provide an improved control mechanism for a hydrostatic-mechanical power transmission system having good response performance, wherein the revolution speed of the power source changes in accordance with variations in throttle position to readily meet a target revolution speed.

DISCLOSURE OF THE INVENTION

In order to accomplish the above object, the control mechanism for a hydrostatic-mechanical power transmission system of the invention provided, as shown in the block diagram of FIG. 1 illustrating the structural principle of the invention, with a mechanical transmission unit driven through an input shaft connectable to a power source, a hydrostatic transmission unit that is connectable to the input shaft and includes a pump and a motor each having a displacement setting swash plate, at least either of the displacement setting swash plates being variable in angle, and a differential unit for connecting an output shaft to the mechanical transmission unit and the hydrostatic transmission unit to drive, comprises:

(a) throttle position detecting means (1) for detecting the position of a throttle;

(b) means for sensing the motor revolution speed;

(c) means for sensing the revolution speed of the power source;

(d) target motor speed ratio setting means (2) for setting, as a function of the position of the throttle detected by the throttle position detecting means (1), a target motor speed ratio that is a target value for the ratio of the sensed motor revolution speed in the hydrostatic transmission unit to the sensed revolution speed of the power source; and (e) swash plate angle control means (3) for controlling at least either of the angles of the displacement setting swash plates by feed-forward control which is a function of the target motor speed ratio set by the target motor speed ratio setting means (2) whereby said control means provides the feed-forward control as a function of the detected throttle position, the sensed motor revolution speed and the sensed power source revolution speed.

In the above arrangement, a target motor speed ratio is set by the target motor speed ratio setting means (2), based on the position of the throttle detected by the throttle position detecting means (1). Since this target motor speed ratio corresponds to the ratio of displacement by the motor to displacement by the pump, the swash plate angle control means (3) directly controls the angles of the displacement setting swash plates by feed-forward control, using the target motor speed ratio as the controlling amount.

Thus, the target motor speed ratio is obtained by the feed-forward control so that the revolution speed of the power source changes in accordance with variations in the position of the throttle to meet a target revolution speed readily. This results in improved response performance.

In a preferable embodiment, the invention further includes motor speed ratio detecting means (4) for detecting an actual motor speed ratio that is an actual value of the ratio of the revolution speed of the motor in the hydrostatic transmission unit to the revolution speed of the power source, and the above swash plate angle control means (3) controls at least either of the angles of said displacement setting swash plates by feed-back control in which a deviation of the actual motor speed ratio detected by the motor speed ratio detecting means (4) from the target motor speed ratio is used, in addition to the feed-forward control in which the target motor speed ratio set by the target motor speed ratio setting means (2) is used.

Preferably, the motor speed ratio detecting means (4) comprises:

(a) power source revolution speed detecting means for detecting an actual revolution speed of the power source;

(b) output shaft revolution speed detecting means for detecting an actual revolution speed of the output shaft; and (c) motor speed ratio calculating means for calculating the actual motor speed ratio, based on the ratio of the actual revolution speed of the output shaft detected by the output shaft revolution speed detecting means to the actual revolution speed of the power source detected by the power source revolution speed detecting means.

Alternatively, the motor speed ratio detecting means (4) comprises:

(a) power source revolution speed detecting means for detecting an actual revolution speed of the power source;

(b) motor revolution speed detecting means for detecting an actual revolution speed of the motor in the hydrostatic transmission unit; and (c) motor speed ratio calculating means for calculating the actual motor speed ratio, based on the ratio of the actual revolution speed of the motor detected by the motor revolution speed detecting means to the actual revolution speed of the power source detected by the power source revolution speed detecting means.

In these cases, the target motor speed ratio setting means (2) preferably comprises:

(a) target revolution speed calculating means for calculating a target revolution speed of the power source from the position of the throttle detected by the throttle position detecting means;

(b) motor speed ratio-revolution speed ratio converting means for converting the actual motor speed ratio calculated by the motor speed ratio calculating means into an actual revolution speed ratio that is an actual value of the ratio of the revolution speed of the output shaft .to the revolution speed of the power source;

(c) target revolution speed ratio calculating means for calculating a target revolution speed ratio that is a target value for the ratio of the revolution speed of the output shaft to the revolution speed of the power source, from the actual revolution speed of the power source detected by the power source revolution speed detecting means, the target revolution speed of the power source calculated by the target revolution speed calculating means and the actual revolution speed ratio obtained from the conversion executed by the motor speed ratio-revolution speed ratio converting means; and (d) target revolution speed ratio-target motor speed ratio converting means for converting the target revolution speed ratio calculated by the target revolution speed ratio calculating means into the target motor speed ratio.

Alternatively, the target motor speed ratio setting means (2) comprises:

(a) target revolution speed calculating means for calculating a target revolution speed of the power source from the position of the throttle detected by the throttle position detecting means;

(b) target revolution speed ratio calculating means for calculating a target revolution speed ratio that is a target value for the ratio of the revolution speed of the output shaft to the revolution speed of the power source, from the target revolution speed of the power source calculated by the target revolution speed calculating means, the actual revolution speed of the power source detected by the power source revolution speed detecting means and a preceding target revolution speed ratio that has been calculated prior to the target revolution speed ratio; and (c) target revolution speed ratio-target motor speed ratio converting means for converting the target revolution speed ratio calculated by the target revolution speed ratio calculating means into the target motor speed ratio.

It should be understood that the above calculation of the target revolution speed of the power source executed by means of the target revolution speed calculating means based on throttle position may be performed, using a specified characteristic functional equation or table.

BRIEF DESCRIPTION OF THE DRAWINGS

FIG. 2 illustrates, in block form, the whole structure of the mechanism;

FIG. 3 is a graph showing the relationship between revolution speed ratio and motor speed ratio; and FIG. 4 is a block diagram showing arithmetic operation performed in a controller section.

BEST MODE FOR CARRYING OUT THE INVENTION

Reference is now made to the drawings for describing a control mechanism for a hydrostatic-mechanical power transmission system according to an embodiment of the invention.

Figure 2:
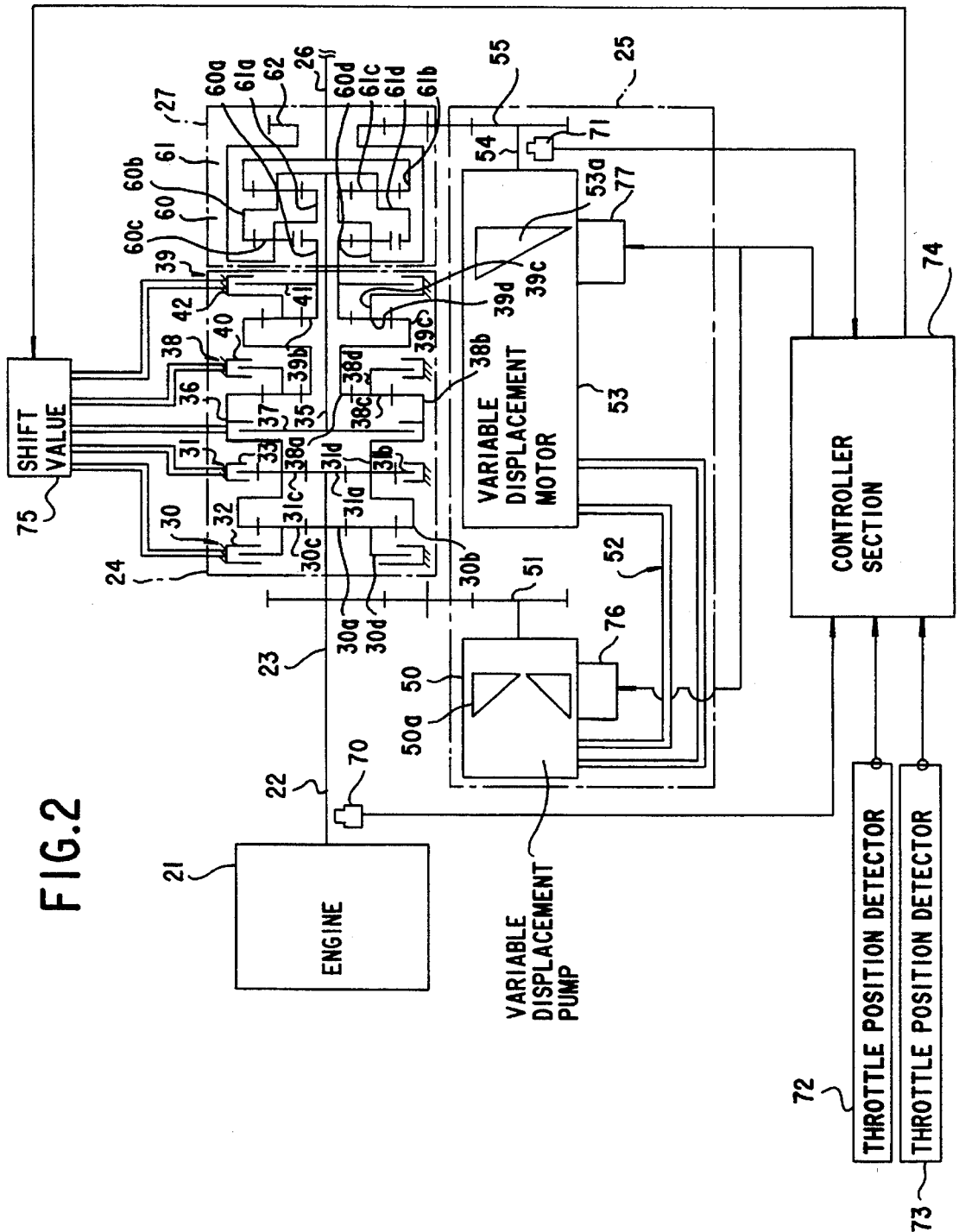

In FIG. 2, there are provided a mechanical transmission unit 24 with a transmission for providing three forward speeds and three reverse speeds and a hydrostatic transmission unit 25 having a hydraulic pump-motor. These units 24 and 25 are connected to an input shaft 23 connected coaxially to an output shaft 22 of an engine 21 which is employed as one example of the power source of the system according to the invention, so that power transmitted from the engine 21 is split. There is also provided a differential unit 27 that connects an output shaft 26 selectively to both the mechanical transmission unit 24 and the hydrostatic transmission unit 25, or to the hydrostatic transmission unit 25 only, for driving.

The mechanical transmission unit 24, the hydrostatic transmission unit 25 and the differential unit 27 will be hereinafter described in that order.

(1) Mechanical Transmission Unit 24

In FIG. 2, the input shaft 23 is provided with a reverse planetary gear train 30 and a forward planetary gear train 31. The gear trains 30 and 31 are of the single planetary type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c which is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b which is positioned outside the sun gear 31a and can be hydraulically braked by a forward hydraulic clutch 33; a planet gear 31c which is in mesh with the gears 31a and 31b, being positioned therebetween; and a planet carrier 31d that is for the planet gear 31c and is integral with the ring gear 30b of the reverse planetary gear train 30.

There is provided an intermediate shaft 35 positioned coaxially with and in an extending direction of the input shaft 23. In FIG. 2, the intermediate shaft 35 is provided, at the left end thereof, with a clutch board 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left in FIG. 2.

The first 3rd-speed planetary gear train 38 is composed of a sun gear 38a rotatably supported by the intermediate shaft 35; a ring gear 38b which is positioned outside the sun gear 38a, being integral with the planet carrier 31d of the forward planetary gear train 31 and the 2nd-speed hydraulic clutch 36; a planet gear 38c which is in mesh with the gears 38a and 38b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39b which is rotatably supported by the intermediate shaft 35, being integral with a clutch board 41; a ring gear 39c which is positioned outside the sun gear 39b, being integral with the sun gear 38a of the first 3rd-speed planetary gear train 38; a planet gear 39d which is in mesh with the gears 39b and 39c, being positioned therebetween; and a fixed planet carrier 39e that is for the planet gear 39d and is integral with a 1st-speed hydraulic clutch 42 hydraulically connectable to the clutch board 41.

(2) Hydrostatic Transmission Unit 25

The input shaft 23 is coupled through a gear train 51 to a variable displacement pump 50 having a displacement setting variable-angle swash plate 50a which swings both in the positive and negative directions. The variable displacement pump 50 is connected, through a pair of conduits 52 consisting of an outgoing path and a return path, to a variable displacement motor 53 having a displacement setting variable-angle swash plate 53a which swings in one direction. An output shaft 54 of the variable displacement motor 53 is connected to a gear train 55. The displacement setting variable-angle swash plates 50a and 53a provided in the variable displacement pump 50 and the variable displacement motor 53 are arranged such that the revolution speed of the variable displacement pump 50 and that of the variable displacement motor 53 vary according to variations in the angles of the displacement setting variable-angle swash plates 50a and 53a, as described below.

The revolution speed of the variable displacement pump 50 is specified, and the displacement setting variable-angle swash plate 53a of the variable displacement motor 53 is inclined at a maximum tilt angle. In the above condition, as the tilt angle of the displacement setting variable-angle swash plate 50a of the variable displacement pump 50 is inclined from zero in the positive direction, the revolution speed of the variable displacement motor 53 increases from zero in the positive direction. Then, the tilt angle of the displacement setting variable-angle swash plate 50a of the variable displacement pump 50 is set to a maximum positive value. In this condition, as the tilt angle of the displacement setting variable-angle swash plate 53a of the variable displacement motor 53 is decreased, the revolution speed of the variable displacement motor 53 further increases in the positive direction.

On the other hand, as the tilt angle of the displacement setting variable-angle swash plate 50a of the variable displacement pump 50 is inclined from zero in the negative direction in condition that the displacement setting variable-angle swash plate 53a of the variable displacement motor 53 is inclined at a maximum tilt angle, the revolution speed of the variable displacement motor 53 increases from zero in the negative direction. Then, the tilt angle of the displacement setting variable-angle swash plate 50a of the variable displacement pump 50 is set to a maximum negative value.

In this condition, as the tilt angle of the displacement setting variable-angle swash plate 53a of the variable displacement motor 53 is decreased, the revolution speed of the variable displacement motor 53 further increases in the negative direction.

(3) Differential Unit 27

In FIG. 2, the intermediate shaft 35 is provided, at the right end, with a first differential planetary gear train 60 of the double planetary type and a second differential planetary gear train 61 of the single planetary type. These gear trains 60 and 61 are aligned coaxially with and in an extending direction of the intermediate shaft 35 in this order when enumerating from the left. The first differential planetary gear train 60 is composed of a sun gear 60a which is rotatably supported by the intermediate shaft 35, being integral with the sun gear 39b of the second 3rd-speed planetary gear train 39 and the clutch board 41; one ring gear 60b positioned outside the sun gear 60a; a planet gear 60c which is in mesh with the other of the ring gears 60b; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a which is rotatably supported by the intermediate shaft 35, being integral with the planet carrier 60d of the first differential planetary gear train 60; a ring gear 61b which is positioned outside the sun gear 61a, being integral with the output shaft 26 positioned (at the right hand in FIG. 2) coaxially with and in an extending direction of the intermediate shaft 35; a planet gear 61c which is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 1:
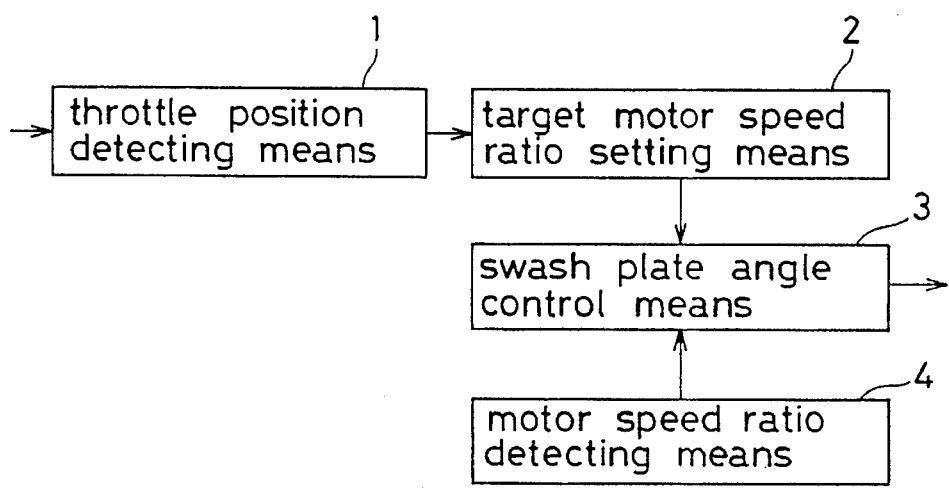
FIG. 1 is a block diagram illustrating the principle of the structure of the present invention disclosed in the claims.
Figure 3:
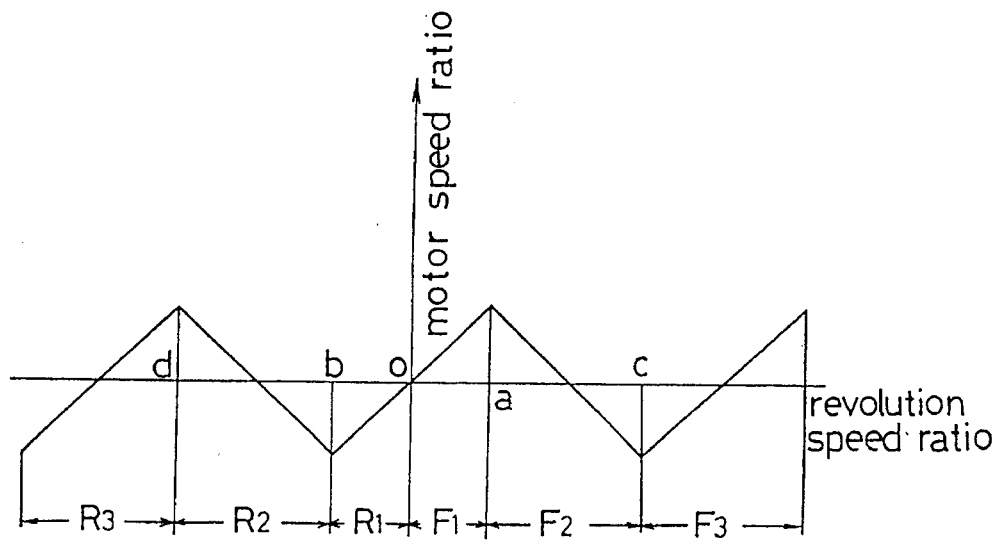
FIGS. 2 through 4 are diagrams illustrating an embodiment of the control mechanism for a hydrostatic-mechanical power transmission system according to the invention.

There will be given an explanation on the mechanical operations of the mechanical transmission unit 24, the hydrostatic transmission unit 25 and the differential unit 27. FIG. 3 shows the relationship between revolution speed ratio (i.e., the ratio of the revolution speed of the output shaft 26 to the revolution speed of the output shaft 22 of the engine 21 (=the revolution speed of the engine)) and motor speed ratio (i.e., the ratio of the revolution speed of the output shaft 54 of the variable displacement motor 53 (=the revolution speed of the motor) to the revolution speed of the output shaft 22 of the engine 21 (=the revolution speed of the engine)) in the respective speed ranges (i.e., 1st forward speed F1; 2nd forward speed F2; 3rd forward speed F3; 1st reverse speed R1; 2nd reverse speed R2; and 3rd reverse speed R3).

(i) 1st Forward Speed F1 and 1st Reverse Speed R1

Only the 1st-speed hydraulic clutch 42 is engaged. The engagement of the clutch 42 causes the sun gear 60a of the first differential planetary gear train 60 to be hydraulically braked through the clutch board 41 and the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary gear train 60, the planet carrier 61d, the planet gear 61c and the ring gear 61b of the second differential gear train 61 in the differential unit 27; and the output shaft 26 in that order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the revolution speed of the output shaft 26 also increases from zero in the negative direction. Thus, the revolution speed ratio is infinitely varied both in the positive and negative directions within a specified range.

In 1st forward speed F1 and 1st reverse speed R1, neither the forward hydraulic clutch 33 nor the reverse hydraulic clutch 32 may be engaged, or alternatively, either of them may be engaged. However, when taking into account the case that the speed may be shifted to 2nd forward speed F2 or 2nd reverse speed R2 by changing the clutches, it is preferable that the forward hydraulic clutch 33 is engaged at the time of forward drive and the reverse hydraulic clutch 32 is engaged at the time of reverse drive.

In 1st speed, when the revolution speed of the output shaft 26 increases in the positive direction and the revolution speed ratio is a specified positive value a, the relative revolution speed of the 2nd-speed hydraulic clutch 36 in relation to the clutch board 37 becomes zero. In this condition, if the 2nd-speed hydraulic clutch 36 is engaged and the 1st-speed hydraulic clutch 42 is disengaged, 2nd forward speed F2 will be obtained. At that time, the forward hydraulic clutch 33 has been engaged.

In 1st speed, when the revolution speed of the output shaft 26 increases in the negative direction and the revolution speed ratio is a specified negative value b, the relative revolution speed of the 2nd-speed hydraulic clutch 36 in relation to the clutch board 37 becomes zero. In this condition, if the 2nd-speed hydraulic clutch 36 is engaged and the 1st-speed hydraulic clutch 42 is disengaged like the above case, 2nd reverse speed R2 will be obtained. At that time, the reverse hydraulic clutch 32 has been engaged.

(ii) Second Forward Speed F2

Since the clutch board 37 is hydraulically connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. As the torque is transmitted, the revolution speed of the input shaft 23 decreases. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction.

When the motor speed ratio is positive in 2nd forward speed F2, part of torque from the second differential planetary gear train 61 in the differential unit 27 flows backwardly to the input gear 62 through the planet gear 61c, the sun gear 61a of the second differential planetary gear train 61 and the first differential planetary gear train 60 so that the variable displacement motor 53 performs its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21.

When the motor speed ratio is negative on the other hand, part of the torque of the input shaft 23 drives the variable displacement pump 50 through the gear train 51. The drive of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed F2, when the revolution speed ratio is increased to a specified value c, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd forward speed F3 will be obtained.

In 2nd forward speed F2, when the revolution speed ratio decreases from a higher value to the specified value a, the relative revolution speed of the 1st-speed hydraulic clutch 42 in relation to the clutch board 41 becomes zero. In this condition, if the 1st-speed hydraulic clutch 42 is engaged and the 2nd-speed hydraulic clutch 36 is disengaged, 1st forward speed F1 will be obtained.

(iii) 3rd Forward Speed F3

Since the planet carrier 38d of the first 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the input shaft 23 is transmitted through the forward planetary gear train 31, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed is being reduced. The torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, whilst the revolution speed being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed F3, part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the torque is combined with the torque of the engine 21.

When the motor speed ratio is positive on the other hand, part of the torque of the input shaft 23 drives the variable displacement pump 50 through the gear train 51, and the torque of the variable displacement motor 53 is transmitted, as described above, through the gear train 55 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the output shaft 26.

In 3rd forward speed F3, when the revolution speed ratio decreases from a higher value to the specified value c, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd forward speed F2 will be obtained.

(iv) 2nd Reverse Speed R2

Since the clutch board 37 is hydraulically connected by the engagement of the 2nd-speed hydraulic clutch 36 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, whilst the revolution speed being reduced. The torque of the variable displacement motor 53 in the hydrostatic transmission unit 25 is transmitted, as described above, through the output shaft 54 of the variable displacement motor 53, the gear train 55, the input gear 62 and the planet carrier 60d of the first differential planetary gear train 60 in the differential unit 27 to the second differential planetary gear train 61, whilst the revolution speed being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 increases in the negative direction.

In 2nd reverse speed R2, when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed F2, except that the partial flow of the torque of the input shaft 23 toward the hydrostatic transmission unit 25 occurs.

In 2nd reverse speed R2, when the revolution speed ratio decreases from a higher value to a specified value d, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd reverse speed R3 will be obtained.

When the revolution speed ratio is increased to the specified value b in 2nd reverse speed R2, the relative revolution speed of the 1st-speed hydraulic clutch 42 in relation to the clutch board 41 becomes zero. In this condition, if the 1st-speed hydraulic clutch 42 is engaged and the 2nd-speed hydraulic clutch 36 is disengaged, 1st reverse speed R1 will be obtained.

(v) 3rd Reverse Speed R3

Since the planet carrier 38d of the first 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the variable displacement motor 53 in the hydrostatic transmission unit 25 is transmitted, as described above, through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 increases in the negative direction.

In 3rd reverse speed R3, when the motor speed ratio is positive, part of torque from the first and second differential planetary gear trains 60 and 61 in the differential unit 27 flows backwardly to the hydrostatic transmission unit 25 so that the variable displacement motor 53 performs its pumping operation. When the motor speed ratio is negative, the operation to be carried out is the same as that described in the case of 3rd forward speed F3, except that the partial flow of the torque of the input shaft 23 toward the hydrostatic transmission unit 25 occurs.

In 3rd reverse speed R3, when the revolution speed ratio is increased to the specified value d, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd reverse speed R2 will be obtained.

The control operation for the mechanical transmission unit 24 and the hydrostatic transmission unit 25 will be explained hereinbelow.

In FIG. 2, the output shaft 22 of the engine 21 is provided with an engine revolution speed detector 70 for detecting the revolution speed of the output shaft 22 to detect the engine revolution speed $n_E$ of the engine 21, and the output shaft 54 of the variable displacement motor 53 in the hydrostatic transmission unit 25 is provided with a motor revolution speed detector 71 for detecting the revolution speed $n_m$ of the variable displacement motor 53 as well as the direction of the revolution. An engine throttle (not shown) is provided with a throttle position detector 72 for detecting the position X of the engine throttle to be manipulated. A change lever (not shown) is provided with a lever position detector 73 for detecting the lever position FNR (i.e., forward, neutral or reverse position) of the change lever to be manipulated. The engine revolution speed detector 70, the motor revolution speed detector 71, the throttle position detector 72 and the lever position detector 73 issue an engine revolution speed signal, motor revolution speed signal, throttle position signal and lever position signal respectively to a controller section 74. The controller section 74 executes signal processing in accordance with those signals and issues a shift control signal to a shift valve 75 so that the engagements/disengagements of the reverse hydraulic clutch 32, the forward hydraulic clutch 33, the 2nd-speed hydraulic clutch 36, the 3rd-speed hydraulic clutch 40 and the 1st-speed hydraulic clutch 42 are carried out as described above. The controller section 74 also supplies an angle control signal to a change-angle valve 76 for the displacement setting variable-angle swash board 50a of the variable displacement pump 50 and to a change-angle valve 77 for the displacement setting variable-angle swash board 53a of the variable displacement motor 53 respectively.

A target engine revolution speed $N_E$ for the engine 21 according to the position X of the engine throttle operated is obtained and the control direction of the revolution speed ratio according to the lever position FNR of the change lever operated is determined. Thus, the control of the revolution speed ratio is performed in the controller section 74 as shown in Table 1. This control operation is based on the condition (positive or negative etc.) of the actual revolution speed ratio e; the relationship between the actual engine revolution speed $n_E$ that is obtained from the engine revolution speed signal from the engine revolution speed detector 70 and the target engine revolution speed $N_E$ that is obtained from the throttle position signal from the throttle position detector 72; and the lever position FNR obtained from the lever position signal from the lever position detector 73.

TABLE 1

| actual revolution speed ratio e | relation between target engine revolution speed $N_E$ and actual engine revolution speed $n_E$ | lever position FNR | control of revolution speed ratio |
|---|---|---|---|
| ≧0 | $n_E > N_E$ | forward | increase toward positive |
| >0 | $n_E < N_E$ | | decrease toward zero |
| =0 | $n_E < N_E$ | | keep at zero |
| ≧0 | $n_E = N_E$ | | keep constant |
| <0 | $n_E \gtreqless N_E$ (all conditions) | | increase toward zero |
| >0 | $n_E \gtreqless N_E$ (all conditions) | neutral | decrease toward zero |
| =0 | $n_E \gtreqless N_E$ (all conditions) | | keep at zero |
| <0 | $n_E \gtreqless N_E$ (all conditions) | | increase toward zero |
| ≦0 | $n_E > N_E$ | reverse | decrease toward negative |
| <0 | $n_E < N_E$ | | increase toward zero |
| =0 | $n_E < N_E$ | | keep at zero |
| ≦0 | $n_E = N_E$ | | keep constant |
| >0 | $n_E \gtreqless N_E$ (all conditions) | | decrease toward zero |

Figure 4:
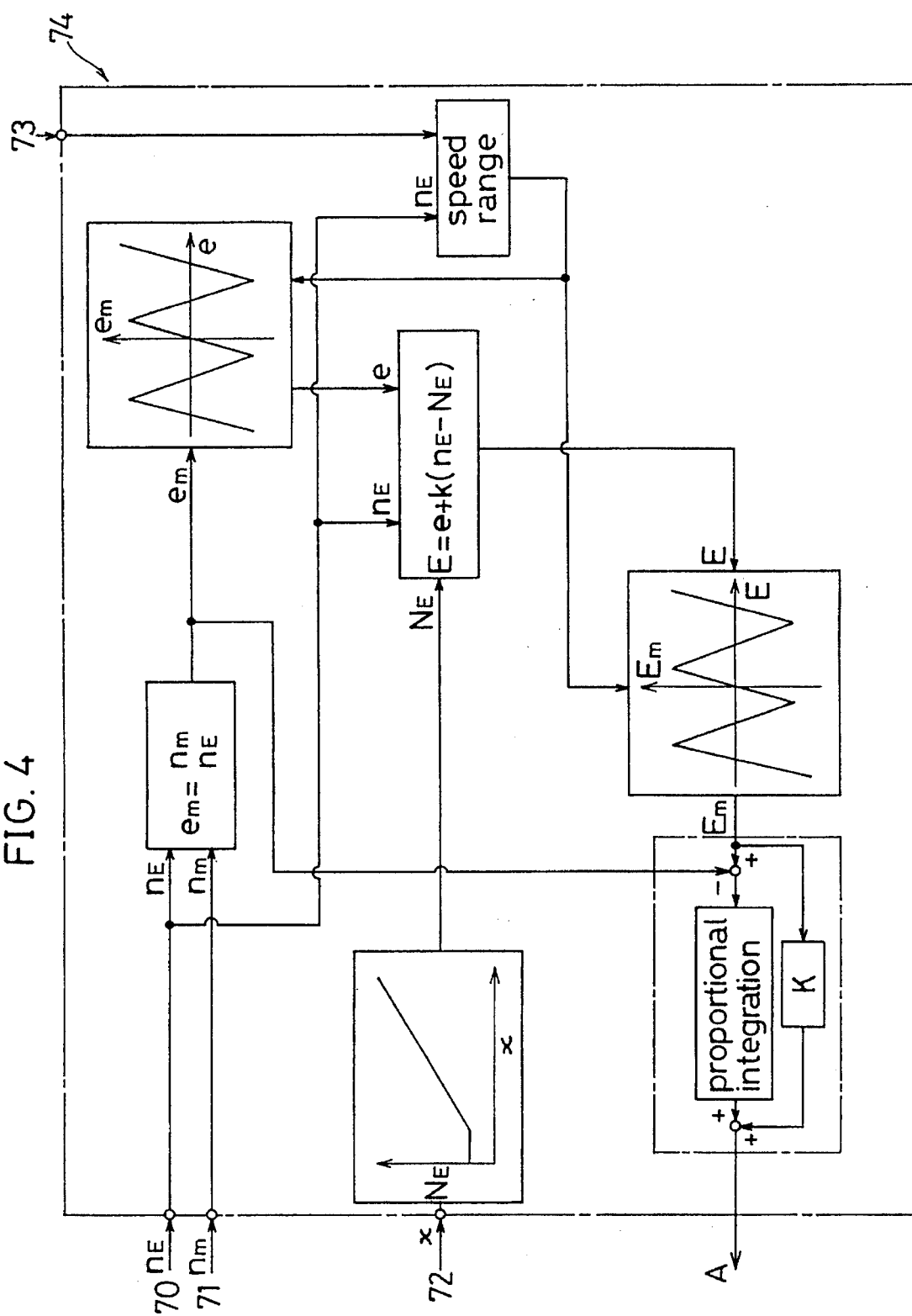

With reference now to FIG. 4, the arithmetic operation in the controller section 74 will be explained.

In accordance with the throttle position signal from the throttle position detector 72, the target engine revolution speed $N_E$ of the engine 21 for the throttle position X is firstly obtained from calculation that includes conversion and is executed by the use of a preliminarily set and stored characteristic functional equation or table. The characteristic functional equation or table is set based on the characteristic curve of the target engine revolution speed $N_E$ for the throttle position X, the characteristic curve having been prepared from the characteristic curve of the torque for the engine revolution speed of the engine 21. Next, the actual motor speed ratio $e_m$ ($=n_m/n_E$), which is the ratio of the actual motor revolution speed $n_m$ to the actual engine revolution speed $n_E$, is calculated from the actual engine revolution speed $n_E$ which has been obtained from the engine revolution speed signal from the engine revolution speed detector 70 and the actual motor revolution speed $n_m$ which has been detected by the motor revolution speed detector 71. Then, the actual motor speed ratio $e_m$ thus obtained is converted using the preset and stored characteristic functional equation $e=f(e_m)$ or table in accordance with the control state (speed range) of the mechanical transmission unit 24 controlled through the shift valve 75 based on the aforesaid actual engine revolution speed $n_E$ and the lever position FNR instructed by the lever position signal from the lever position detector 73, whereby the actual revolution speed ratio e is obtained. This characteristic functional equation $e=f(e_m)$ or table is represented by a characteristic curve similar to that of FIG. 3, and is set in accordance with the characteristic curve of the actual motor speed ratio $e_m$ for the actual revolution speed ratio e.

The target revolution speed ratio E is obtained from the target engine revolution speed $N_E$ and the actual revolution speed ratio e which have been obtained through the above procedure; and the actual engine revolution speed $n_E$, using the following equation.

$$E = e + k(n_E - N_E) \quad \text{[Eq. 1]}$$

where k is a coefficient the unit of which is 1/rpm.

Then, the target revolution speed ratio E thus obtained is converted, like the above case, using the preset and stored characteristic functional equation $E_m = f(E)$ or table in accordance with the control state (speed range) of the mechanical transmission unit 24, whereby the target motor speed ratio $E_m$ is obtained. The characteristic functional equation $E=f(E_m)$ or table is also represented by a characteristic curve similar to that of FIG. 3 and is set in accordance with the characteristic curve of the target motor speed ratio $E_m$ for the target revolution speed ratio E. From the target motor speed ratio $E_m$ thus obtained and the actual motor speed ratio $e_m$, an operating amount A is obtained, the operating amount A being the sum of the feed forward amount $KE_m$ (K: feed forward coefficient) proportional to the target motor speed ratio $E_m$ and the proportional elements and integral elements of the deviation ($=E_m-e_m$) of the actual motor speed ratio $e_m$ with respect to the target motor speed ratio $E_m$. The operating amount A is supplied, in the form of an angle control signal, to the change-angle valves 76 and 77.

Thus, the actual motor speed ratio $e_m$ is controlled by the target motor speed ratio $E_m$, and the actual revolution speed ratio e is controlled by the target revolution speed ratio E so that the actual engine revolution speed $n_E$ is made coincident with the target engine revolution speed $N_E$ for the throttle position X of the engine throttle.

According to the above embodiment, in order to control the angle of the displacement setting variable-angle swash plate 50a of the variable displacement pump 50 and the angle of the displacement setting variable-angle swash plate 53a of the variable displacement motor 53, an angle control signal corresponding to the target motor speed ratio $E_m$ is generated based on the feed forward amount $KE_m$ proportional to the target motor speed ratio $E_m$, using the motor speed ratio described by the following equation. This motor speed ratio is proportional to the displacement ratio of the variable displacement pump 50 to the variable displacement motor 53, so that faster response can be achieved.

$$e_m = n_m/n_E = q_p/q_m \times 1/\rho \times \eta_p \times \eta_m$$

where $q_p$: displacement of the variable displacement pump 50

$q_m$: displacement of the variable displacement motor 53

$\eta_p$: volume efficiency of the variable displacement pump 50

$\eta_m$: volume efficiency of the variable displacement motor 53

$\rho$: reduction gear ratio from the engine 21 to the variable displacement pump 50

Since proportional and integration control is performed on the deviation ($=E_m-e_m$), control with better convergence to the target engine revolution speed $N_E$ can be achieved. Further, when the actual engine revolution speed $n_E$ is equal to the target engine revolution speed $N_E$, the target revolution speed ratio E obtained from the equation [Eq. 1] is equal to the actual revolution speed ratio e, and therefore the actual engine revolution speed $n_E$ can be steadily kept to be the target engine revolution speed $N_E$.

In the above embodiment, the equation [Eq. 1] is used for obtaining the target revolution speed ratio E, but the following equation may be used.

$$E = e \times n_E/N_E$$

It is also possible to use either of the following equations, with the preceding target revolution speed ratio E'.

$$E = E' + k\ (n_E - N_E)$$

$$E = E' \times n_E/N_E$$

In this case, there is no need to obtain the actual revolution speed ratio e for obtaining the target revolution speed ratio E.

In the above embodiment, the actual motor speed ratio $e_m$ is obtained directly from the ratio of motor revolution speed to engine revolution speed, but it is possible to obtain it from the ratio of output shaft revolution speed to input shaft revolution speed in consideration of the reduction gear ratio for the torque of the engine 21 and other factors, detecting the revolution speeds of the input shaft 23 and the output shaft 26. Alternatively, it is possible to obtain the actual motor speed ratio $e_m$ from the ratio of motor revolution speed to input shaft revolution speed, detecting the revolution speeds of the input shaft 23 and the output shaft 54 of the variable displacement motor 53. In the above cases, it is possible to obtain the target motor speed ratio $E_m$ through the following calculation: firstly, the target revolution speed of the input shaft 23 for the throttle position X indicated by the throttle position signal from the throttle position detector 72 is obtained; the actual motor speed ratio $e_m$ is converted into the ratio of the revolution speed of the input shaft 23 to the revolution speed of the output shaft 26; and then the target ratio of the revolution speed of the output shaft 26 to the revolution speed of the input shaft 23 is obtained.

Further, the actual motor speed ratio may be obtained from the ratio of output shaft revolution speed to engine revolution speed or the ratio of motor revolution speed to output shaft revolution speed, taking the reduction gear ratio for the torque of the engine 21 and other factors into account.

According to the operating amount A, the angle of the displacement setting variable-angle swash plate 50a of the variable displacement pump 50 and the angle of the displacement setting variable-angle swash plate 53a of the variable displacement motor 53 are controlled through the change-angle valves 76 and 77 in the embodiment, but either one of the angles of the displacement setting variable-angle swash plates 50a and 53a may be controlled.

INDUSTRIAL APPLICABILITY

According to the invention, the revolution speed of the power source readily becomes a target revolution speed to comply with variations in the position of the throttle so that superior response can be achieved. Therefore, the control mechanism for a hydrostatic-mechanical power transmission system of the invention is particularly suitable for mounting on track-laying vehicles such as bulldozers, power-shovels and cranes.

What is claimed is:

1. A control mechanism for a hydrostatic-mechanical power transmission system, provided with a mechanical transmission unit driven through an input shaft connectable to a power source, a hydrostatic transmission unit that is connectable to the input shaft and includes a pump and a motor each having a displacement setting swash plate, at least one of the displacement setting swash plates being variable in angle, and a differential unit for connecting an output shaft to the mechanical transmission unit and the hydrostatic transmission unit to drive, comprising:

(a) throttle position detecting means for detecting the position of a throttle in relation to the power source;

(b) target motor speed ratio setting means for setting, based on the position of the throttle detected by the throttle position detecting means, a target motor speed ratio that is a target value for a ratio of a revolution speed of the motor in the hydrostatic transmission unit to a revolution speed of the power source; and (c) swash plate angle control means for controlling at least one of the angles of the displacement setting swash plates by feed-forward control in which the target motor speed ratio set by the target motor speed ratio setting means is used in such a way that the ratio of a displacement volume of the pump to a displacement volume of the motor is made to follow the target motor speed ratio.

2. The control mechanism for a hydrostatic-mechanical power transmission system as claimed in claim 1, the mechanism further comprising motor speed ratio detecting means for detecting an actual motor speed ratio that is an actual value of the ratio of the revolution speed of the motor in the hydrostatic transmission unit to the revolution speed of the power source, wherein said swash plate angle control means controls at least one of the angles of said displacement setting swash plates by feed-back control in which a deviation of the actual motor speed ratio detected by the motor speed ratio detecting means from the target motor speed ratio is used, in addition to the feed-forward control in which the target motor speed ratio set by the target motor speed ratio setting means is used.

3. The control mechanism for a hydrostatic-mechanical power transmission system as claimed in claim 1, wherein said mechanical transmission unit comprises a transmission for providing a plurality of speed ranges.

4. The control mechanism for a hydrostatic-mechanical power transmission system as claimed in claim 2 or 3, wherein said motor speed ratio detecting means comprises:

(a) power source revolution speed detecting means for detecting an actual revolution speed of said power source;

(b) output shaft revolution speed detecting means for detecting an actual revolution speed of said output shaft; and (c) motor speed ratio calculating means for calculating the actual motor speed ratio, based on the ratio of the actual revolution speed of the output shaft detected by the output shaft revolution speed detecting means to the actual revolution speed of the power source detected by the power source revolution speed detecting means.

5. The control mechanism for a hydrostatic-mechanical power transmission system as claimed in claim 4, wherein said target motor speed ratio setting means comprises:

(a) target revolution speed calculating means for calculating a target revolution speed of the power source from the position of the throttle detected by the throttle position detecting means;

(b) motor speed ratio-revolution speed ratio converting means for converting the actual motor speed ratio calculated by the motor speed ratio calculating means into an actual revolution speed ratio that is an actual value of the ratio of the revolution speed of the output shaft to the revolution speed of the power source;

(c) target revolution speed ratio calculating means for calculating a target revolution speed ratio that is a target value for the ratio of the revolution speed of the output shaft to the revolution speed of the power source, from the actual revolution speed of the power source detected by the power source revolution speed detecting means, the target revolution speed of the power source calculated by the target revolution speed calculating means and the actual revolution speed ratio obtained from the conversion executed by the motor speed ratio-revolution speed ratio converting means; and (d) target revolution speed ratio-target motor speed ratio converting means for converting the target revolution speed ratio calculated by the target revolution speed ratio calculating means into the target motor speed ratio.

6. The control mechanism for a hydrostatic-mechanical power transmission system as claimed in claim 5, wherein the calculation of the target revolution speed of the power source executed by means of the target revolution speed calculating means based on the position of the throttle is performed, using a specified characteristic functional equation or table.

7. The control mechanism for a hydrostatic-mechanical power transmission system as claimed in claim 5, wherein the calculation executed by said target revolution speed ratio calculating means is based on:

$$E=e+k(n-N),$$

where E is the target revolution speed ratio that is a target value for the ratio of the revolution speed of the output shaft to the revolution speed of the power source, e is the actual revolution speed ratio, n is the actual revolution speed of the power source, N is the target revolution speed of the power source and k is a coefficient.

8. The control mechanism for a hydrostatic-mechanical power transmission system as claimed in claim 5, wherein the calculation executed by said target revolution speed ratio calculating means is based on:

$$E=e \times n/N,$$

where E is the target revolution speed ratio that is a target value for the ratio of the revolution speed of the output shaft to the revolution speed of the power source, e is the actual revolution speed ratio, n is the actual revolution speed of the power source and N is the target revolution speed of the power source.

9. The control mechanism for a hydrostatic-mechanical power transmission system as claimed in claim 4, wherein said target motor speed ratio setting means comprises:

(a) target revolution speed calculating means for calculating a target revolution speed of the power source from the position of the throttle detected by the throttle position detecting means;

(b) target revolution speed ratio calculating means for calculating a target revolution speed ratio that is a target value for the ratio of the revolution speed of the output shaft to the revolution speed of the power source, from the target revolution speed of the power source calculated by the target revolution speed calculating means, the actual revolution speed of the power source detected by the power source revolution speed detecting means and a preceding target revolution speed ratio that has been calculated prior to said target revolution speed ratio; and (c) target revolution speed ratio-target motor speed ratio converting means for converting the target revolution speed ratio calculated by the target revolution speed ratio calculating means into the target motor speed ratio.

10. The control mechanism for a hydrostatic-mechanical power transmission system as claimed in claim 9, wherein the calculation executed by said target revolution speed ratio calculating means is based on:

$$E=E'+k(n-N),$$

where E is the target revolution speed ratio that is a target value for the ratio of the revolution speed of the output shaft to the revolution speed of the power source, E' is the preceding target revolution speed ratio, n is the actual revolution speed of the power source, N is the target revolution speed of the power source and k is a coefficient.

11. The control mechanism for a hydrostatic-mechanical power transmission system as claimed in claim 9, wherein the calculation executed by said target revolution speed ratio calculating means is based on:

$$E=E' \times n/N,$$

where E is the target revolution speed ratio that is a target value for the ratio of the revolution speed of the output shaft to the revolution speed of the power source, E' is the preceding target revolution speed ratio, n is the actual revolution speed of the power source and N is the target revolution speed of the power source.

12. The control mechanism for a hydrostatic-mechanical power transmission system as claimed in claim 9, wherein the calculation of the target revolution speed of the power source executed by means of the target revolution speed calculating means based on the position of the throttle is performed, using a specified characteristic functional equation or table.

13. The control mechanism for a hydrostatic-mechanical power transmission system as claimed in claim 2 or 3, wherein said motor speed ratio detecting means comprises:
   (a) power source revolution speed detecting means for detecting an actual revolution speed of said power source;
   (b) motor revolution speed detecting means for detecting an actual revolution speed of the motor in the hydrostatic transmission unit; and
   (c) motor speed ratio calculating means for calculating the actual motor speed ratio, based on the ratio of the actual revolution speed of the motor detected by the motor revolution speed detecting means to the actual revolution speed of the power source detected by the power source revolution speed detecting means.

14. The control mechanism for a hydrostatic-mechanical power transmission system as claimed in claim 13, wherein said target motor speed ratio setting means comprises:
   (a) target revolution speed calculating means for calculating a target revolution speed of the power source from the position of the-throttle detected by the throttle position detecting means;
   (b) motor speed ratio-revolution speed ratio converting means for converting the actual motor speed ratio calculated by the motor speed ratio calculating means into an actual revolution speed ratio that is an actual value of the ratio of the revolution speed of the output shaft to the revolution speed of the power source;
   (c) target revolution speed ratio calculating means for calculating a target revolution speed ratio that is a target value for the ratio of the revolution speed of the output shaft to the revolution speed of the power source, from the actual revolution speed of the power source detected by the power source revolution speed detecting means, the target revolution speed of the power source calculated by the target revolution speed calculating means and the actual revolution speed ratio obtained from the conversion executed by the motor speed ratio-revolution speed ratio converting means; and
   (d) target revolution speed ratio-target motor speed ratio converting means for converting the target revolution speed ratio calculated by the target revolution speed ratio calculating means into the target motor speed ratio.

15. The control mechanism for a hydrostatic-mechanical power transmission system as claimed in claim 13, wherein said target motor speed ratio setting means comprises:
   (a) target revolution speed calculating means for calculating a target revolution speed of the power source from the position of the throttle detected by the throttle position detecting means;
   (b) target revolution speed ratio calculating means for calculating a target revolution speed ratio that is a target value for the ratio of the revolution speed of the output shaft to the revolution speed of the power source, from the target revolution speed of the power source calculated by the target revolution speed calculating means, the actual revolution speed of the power source detected by the power source revolution speed detecting means and a preceding target revolution speed ratio that has been calculated prior to said target revolution speed ratio; and
   (c) target revolution speed ratio-target motor speed ratio converting means for converting the target revolution speed ratio calculated by the target revolution speed ratio calculating means into the target motor speed ratio.

16. The control mechanism for a hydrostatic-mechanical power transmission system as claimed in claim 2 or 3, wherein said motor speed ratio detecting means comprises:
   (a) input shaft revolution speed detecting means for detecting an actual revolution speed of said input shaft;
   (b) output shaft revolution speed detecting means for detecting an actual revolution speed of said output shaft; and
   (c) motor speed ratio calculating means for calculating the actual motor speed ratio, based on the ratio of the actual revolution speed of the output shaft detected by the output shaft revolution speed detecting means to the actual revolution speed of the input shaft detected by the input shaft revolution speed detecting means.

17. The control mechanism for a hydrostatic-mechanical power transmission system as claimed in claim 2 or 3, wherein said motor speed ratio detecting means comprises:
   (a) input shaft revolution speed detecting means for detecting an actual revolution speed of the input shaft;
   (b) motor revolution speed detecting means for detecting an actual revolution speed of the motor in the hydrostatic transmission unit; and
   (c) motor speed ratio calculating means for calculating the actual motor speed ratio, based on the ratio of the actual revolution speed of the motor detected by the motor revolution speed detecting means to the actual revolution speed of the input shaft detected by the input shaft revolution speed detecting means.

18. The control mechanism for a hydrostatic-mechanical power transmission system as claimed in claim 2 or 3, wherein said motor speed ratio detecting means comprises:
   (a) output shaft revolution speed detecting means for detecting an actual revolution speed of the output shaft;
   (b) motor revolution speed detecting means for detecting an actual revolution speed of the motor in the hydrostatic transmission unit; and
   (c) motor speed ratio calculating means for calculating the actual motor speed ratio, based on the ratio Of the actual revolution speed of the motor detected by the motor revolution speed detecting means to the actual revolution speed of the output shaft detected by the output shaft revolution speed detecting means.

* * * * *